3,331,657
METHOD OF PREVENTING THE DEPOSITING OF SULFUR IN THE RISER PIPES IN PRODUCING NATURAL GASES LADEN WITH HYDROGEN SULFIDE AND CONTAINING ELEMENTAL SULFUR IN SOLUTION
Siegfried Peter, Hannover, and Otto Buchholz, uber Lehrte, Germany, assignors to Gewerkschaft Elwerath, Hannover, Germany
No Drawing. Filed Apr. 3, 1963, Ser. No. 270,191
Claims priority, application Germany, Apr. 6, 1962, G 34,657
10 Claims. (Cl. 23—3)

The present invention relates to a method for the prevention of the depositing of elementary sulfur from gases containing methane, especially natural gases which, owing to a high content of hydrogen sulfide, contain elementary sulfur in solution. It is known that at pressures of several hundreds atmospheres and high temperatures gases with relatively high contents of hydrogen sulfide are capable of dissolving appreciable quantities of elementary sulfur. This phenomenon was seriously studied by Kennedy and Wieland (H. T. Kennedy and D. R. Wieland, Petr. Trans. AIME 219, 166 (1960)). They found that the solubility of the elementary sulfur increases in the gas phase with increasing hydrogen sulfur content, with rising temperature and increases in pressure.

When being drawn off or produced, the gases in rising pass through cooler strata and cool. The dissolved sulfur, as the solubility decreases due to the cooling, separates and settles on the pipe wall, with the result that stoppages can occur. The sulfur deposit becomes particularly compact and strongly adhesive if it takes place at temperatures in the neighborhood of the melting point of the sulfur.

The method according to the invention utilizes, for preventing the depositing of solid sulfur on the walls of the producer pipeline drawing off the gas, the fact that sulfur dissolves in aqueous alkali sulfide solutions thereby forming alkali polysulfides. Thus polysulfides with different sulfur contents are derived from the hydrogen polysulfides $H_2S_2$, $H_2S_3$, $H_2S_4$, $H_2S_5$ and so forth. Polysulfides having four or five sulfur atoms per molecule are often considered to be particularly stable. Therefore according to the method of the persent invention, an aqueous alkali solution is added to the rising gas at a suitable depth, for example at the head of the gas deposit. The alkali solution reacts with the hydrogen sulfide of the gas thereby forming alkali sulfide and the elementary sulfur present in the gas phase is dissolved in the solution containing the alkali sulfide at higher temperatures with sufficient speeds, thereby forming alkali polysulfides of varying composition. The solution is entrained by the gas current either in the form of drops or intermittently (in slugs) and separated in a separator above ground. The carbon dioxide present in the gas current also dissolves in the alkali metal hydroxide solution in forming carbonates, but these cannot cause any serious disturbances because hydrogen polysulfides have a much higher acidity than carbonic acid and the carbonic acid is forced out of the solution.

The method according to the invention for dissolving the entrained elementary sulfur, thereby forming alkali polysulfides, possesses the advantage over the method in which sulfur is carried along by the gas current in solid state, that only liquid has to be separated from the gas current above ground. Natural gas, due to the interstitial water present in the ground, tends to become saturated with water vapor. During the production, the gas in rising passes through cooler strata and cools down. As a result the gas current becomes oversaturated with water vapor and water separates out in liquid state in a quantity corresponding to the degree of cooling. Thus water, that is liquid has generally to be separated above ground. However, in the event of relatively large quantities of solids as well as liquid being present at the same time, the separation of the condensed phases from the gas current is always made more difficult because there is then a danger of agglutination and the formation of agglomerates.

The sulfur can be precipitated by acidification, for example with hydrochloric or sulfuric acid and subsequently filtered off from the alkali polysulfide solutions separated from the gas current above ground by the process according to the invention. If readily volatile alkalis such as ammonia are added, the dissolved sulfur can also be precipitated by driving off the ammonia by heating and/or stripping the polysulfide solution and subsequently filtered off. In this case the filtered water freed from the sulfur is preferably pumped back into the circulation in the riser after a suitable quantity of ammonia gas has been added, and introduced into the gas current at a suitable depth, for example at the head of the gas deposit, with the object of dissolving the entrained elementary sulfur. Thus the quantity of water accumulating on the well, the removal of which in a drain presents difficulties owing to the pollution by small quantities of sulfidic sulfur, can be confined to a minimum.

EXAMPLE

The gas to be produced has the following composition: 13 vol. percent $H_2S$, 10 vol. percent $CO_2$, 5 vol. percent nitrogen, 72 vol. percent methane. In the deposit the temperature at a depth of about 3000 mtrs. is 145° C. The gas pressure amounts to 390 atmospheres. The deposit contains so much elementary sulfur that the gas is saturated with sulfur. According to the investigations by Kennedy and Wieland, a gas of this composition is capable of dissolving under the conditions mentioned, 2.5 gr. of sulfur per cubic meter. The gas is conducted by a 2⅜ inch pipe string which is located in a 5 inch protecting string. Through the annular space between the two pipe strings 2 cubic metres of a 10% aqueous solution of an alkali, especially ammonia, are added per day to the rising gas current amounting to 100,000 Nm.³ per day at the head of the deposit. The solution can be fed to the rising gas current through the annular space between the producer pipe string and the protecting pipe string or through a special pipe string. In the high pressure separator above ground about 3 m.³ of aqueous solution of ammonium polysulfide are separated daily at a temperature of 30° C. The sulfur dissolved as ammonium polysulfide is precipitated either by heating and/or stripping the solution with air or gas. It is present in readily filterable form. The water can be removed from the precipitated sulfur either by filtration or by decantation.

What is claimed is:
1. In a method of preventing the formation of solid sulfur in a stream of natural gas during upward passage of the same from a subterranean natural gas deposit, said natural gas including $H_2S$, $CO_2$ and elementary sulfur and being initially at an elevated pressure and temperature sufficiently high to maintain said sulfur in solution in said $H_2S$, the step of introducing into said stream of natural gas during upward passage of the same, at a point at which the pressure and temperature of said natural gas stream are still sufficiently high to maintain said sulfur in solution in said $H_2S$, an aqueous solution of the hydroxide of at least one substance selected from the group consisting of alkali metals and ammonia so as to form an aqueous solution of the sulfide of said substance having said sulfur dissolved therein in the form of an alkali metal or ammonium polysulfide.

2. A method as defined in claim 1, wherein said hydroxide is ammonium hydroxide.

3. A method as defined in claim 1, and including the steps of recovering the thus formed solution of polysulfide; and acidifying the recovered solution so as to precipitate the sulfur of said polysulfide.

4. A method as defined in claim 1, wherein said hydroxide is ammonium hydroxide, and including the steps of recovering the thus formed solution of ammonium polysulfide; and recovering precipitated sulfur from said dissolved ammonium polysulfide.

5. A method as defined in claim 4, wherein said recovering of precipitated sulfur is carried out by heating said solution of ammonium polysulfide.

6. A method as defined in claim 4, wherein said recovering of precipitated sulfur is carried out by stripping said solution of ammonium polysulfide with a stripping gas.

7. A method as defined in claim 6, wherein said stripping gas is air.

8. A method as defined in claim 1, wherein said aqueous solution is introduced into said stream of natural gas in the vicinity of the head of the natural gas deposit.

9. A method as defined in claim 1, wherein said aqueous solution being introduced into said stream of natural gas contains about 10% of said hydroxide.

10. A method as defined in claim 9, wherein said aqueous solution being introduced into said stream of natural gas is an about 10% solution of ammonium hydroxide.

References Cited

UNITED STATES PATENTS

| | | | |
|---|---|---|---|
| 1,360,734 | 11/1920 | Doherty | 23—181 X |
| 1,771,293 | 7/1930 | Goluud et al. | 23—224 |
| 1,837,493 | 12/1931 | Seil | 23—224 |
| 2,688,368 | 9/1954 | Rodgers et al. | 23—2 X |
| 3,097,917 | 7/1963 | Dotts et al. | 23—2 |

OTHER REFERENCES

Kennedy et al., "Equilibrium in the Methane-Carbon Dioxide-Hydrogen Sulfide-Sulfur System," Petroleum Transactions, AIME, volume 219, 1960, pages 166–169, published in Journal of Petroleum Technology, July 1960.

OSCAR R. VERTIZ, *Primary Examiner.*

E. C. THOMAS, *Examiner.*